(12) United States Patent
Gupta et al.

(10) Patent No.: US 11,914,492 B2
(45) Date of Patent: Feb. 27, 2024

(54) SYSTEM AND METHOD FOR HIGHLY GRANULAR POWER/THERMAL CONTROL IN INFORMATION HANDLING SYSTEMS

(71) Applicant: Dell Products, L.P., Round Rock, TX (US)

(72) Inventors: Chitrak Gupta, Bangalore (IN); Anurag Sharma, Cedar Park, TX (US); Chandrasekhar Puthillathe, Bangalore (IN); Rajeshkumar Ichchhubhai Patel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/069,040

(22) Filed: Oct. 13, 2020

(65) Prior Publication Data

US 2022/0114066 A1 Apr. 14, 2022

(51) Int. Cl.
*G06F 11/22* (2006.01)
*G06F 1/3209* (2019.01)
*G06F 8/656* (2018.01)
*G06F 1/20* (2006.01)

(52) U.S. Cl.
CPC .......... *G06F 11/2284* (2013.01); *G06F 1/206* (2013.01); *G06F 1/3209* (2013.01); *G06F 8/656* (2018.02)

(58) Field of Classification Search
CPC ...... G06F 11/2284; G06F 8/656; G06F 1/206; G06F 1/3209
See application file for complete search history.

(56) References Cited

U.S. PATENT DOCUMENTS

| 5,237,690 A | * | 8/1993 | Bealkowski | G06F 15/177 212/203 |
| 5,532,945 A | * | 7/1996 | Robinson | G06F 1/3215 711/115 |
| 5,634,137 A | * | 5/1997 | Merkin | G06F 9/4401 710/10 |
| 5,935,252 A | * | 8/1999 | Berglund | G06F 1/20 713/300 |
| 6,754,817 B2 | * | 6/2004 | Khatri | G06F 9/4411 710/301 |
| 7,496,772 B1 | * | 2/2009 | Nguyen | G06F 1/3203 713/340 |
| 2007/0089446 A1 | * | 4/2007 | Larson | G05D 23/1931 257/E23.08 |

(Continued)

*Primary Examiner* — Jaweed A Abbaszadeh
*Assistant Examiner* — Brian J Corcoran
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes executable instructions for identifying at least one non-registered hardware device from among the multiple hardware devices that is not registered for use within the IHS by the BMC. For this non-registered hardware device, the BMC generates power profile data. Using the power profile data of the non-registered hardware device, the BMC determines a level of electrical power to sufficiently supply the plurality of hardware devices of the IHS, and controls one or more power supply units to supply the determined level of electrical power to the plurality of hardware devices.

18 Claims, 6 Drawing Sheets

(56) References Cited

U.S. PATENT DOCUMENTS

| | | | | |
|---|---|---|---|---|
| 2007/0109725 | A1* | 5/2007 | Lindell | H05K 7/20836 |
| | | | | 361/600 |
| 2007/0260896 | A1* | 11/2007 | Brundridge | G06F 1/3203 |
| | | | | 713/300 |
| 2008/0313312 | A1* | 12/2008 | Flynn | H04L 67/02 |
| | | | | 709/224 |
| 2015/0355651 | A1* | 12/2015 | Balakrishnan | G06F 1/206 |
| | | | | 700/299 |
| 2017/0111224 | A1* | 4/2017 | Worley | H04L 43/0817 |
| 2021/0125128 | A1* | 4/2021 | Martin | G06Q 30/0283 |

\* cited by examiner

SYSTEM AND METHOD FOR HIGHLY GRANULAR POWER/THERMAL CONTROL IN INFORMATION HANDLING SYSTEMS

FIELD

The present disclosure generally relates to electronics, and, more particularly, to systems and methods for highly granular power/thermal control in information handling systems (IHSs).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions—such as resetting or power cycling the system to get a hung O/S running again. These abilities save on the total cost of ownership of an IHS.

SUMMARY

According to one embodiment, an Information Handling System (IHS) includes multiple hardware devices, and a baseboard management controller (BMC) in communication with the hardware devices. The BMC includes executable instructions for identifying at least one non-registered hardware device from among the multiple hardware devices that is not registered for use within the IHS by the BMC. For this non-registered hardware device, the BMC generates power profile data. Using the power profile data of the non-registered hardware device, the BMC determines a level of electrical power to sufficiently supply the plurality of hardware devices of the IHS, and controls one or more power supply units to supply the determined level of electrical power to the plurality of hardware devices.

According to another embodiment, a method includes identifying at least one non-registered hardware device from among multiple hardware devices that is not registered for use within an IHS by a BMC, and when identified, the method generates power profile data for the at least one non-registered hardware device. Using the power profile data of the non-registered hardware device, the method determines a level of electrical power to sufficiently supply the multiple hardware devices of the IHS, and controls one or more power supply units to supply the determined level of electrical power to the plurality of hardware devices.

According to yet another embodiment, a BMC includes computer-readable instructions for identifying at least one non-registered hardware device from among multiple hardware devices that is not registered for use within an IHS by the BMC, and when identified, the instructions generate power profile data for the at least one non-registered hardware device. Using the power profile data of the non-registered hardware device, the instructions determine a level of electrical power to sufficiently supply the plurality of hardware devices of the IHS, and control one or more power supply units to supply the determined level of electrical power to the plurality of hardware devices.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

Embodiments described herein comprise systems and methods for high granularity control of power and/or thermal characteristics of an Information Handling System (IHS). The system and method uses a baseboard management controller (BMC) configured on the IHS to obtain power profile data as well as thermal profile data for the hardware devices configured in the IHS, and, based on this data, optimally control the power and thermal system of the IHS. For some or most of the hardware devices, the power profile data and thermal profile data is obtained from the system Basic Input/Output System (BIOS). For other cases, the power profile data and thermal profile data is obtained from user input and validated to ensure its validity against one or more parameters. In some embodiments, a trial and error thermal profile acquisition technique may be employed to empirically determine a thermal profile for a hardware device, such as one that is not registered in the system BIOS.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
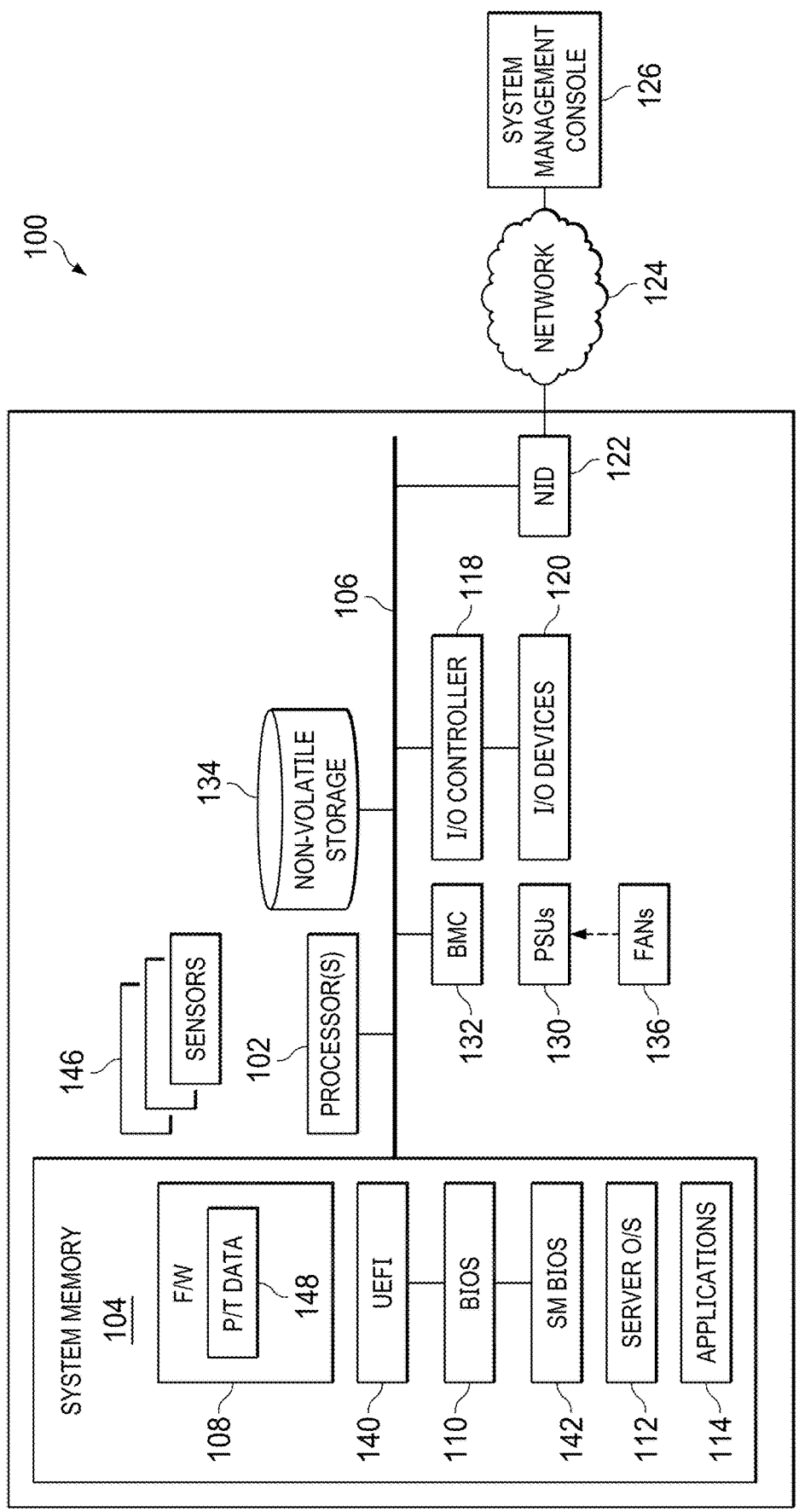
FIG. 1 is a block diagram of examples of components of an Information Handling System (IHS), according to some embodiments.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of a IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

In many cases, the hardware devices configured on a typical IHS 100 are registered in its system BIOS. In such cases, BIOS 110 may be accessed to obtain the power/thermal profile data table 148 for those hardware devices registered in BIOS 110. For any non-registered (unsupported/unqualified) hardware device, however, its power profile and/or thermal profile may be unknown. In such situations, the server thermal control is often required to run in an open loop. That is, the thermal profile for the IHS 100 may be difficult, if not impossible, to optimize.

Power related issues also exist. For example, if a non-registered hardware device draws power beyond a maximum capacity of PSU(s) 130 is reached or exceeded, hardware protection may prevent the IHS from even booting. Additionally, if the incoming non-registered hardware device's power budget is higher than existing power capacity of the system, it can, and often will, halt the IHS during BIOS Power On Self Test (POST), such as with an F1 and/or F2 error.

In summary, any update (e.g., software update or physical hardware device replacement) by third parties are fraught with danger as it may impact the hardware health of IHS 100. Accordingly, the challenges incurred by such actions are of utmost importance. There is a growing requirement from multiple users to support non-registered hardware devices 220 with regard to their power and thermal profile data. For example, many telecommunications implementations want to provide such support for their Edge and Telecom solutions. For such requirements, dynamic management of the power and thermal tables become an important driver.

Figure 2A:
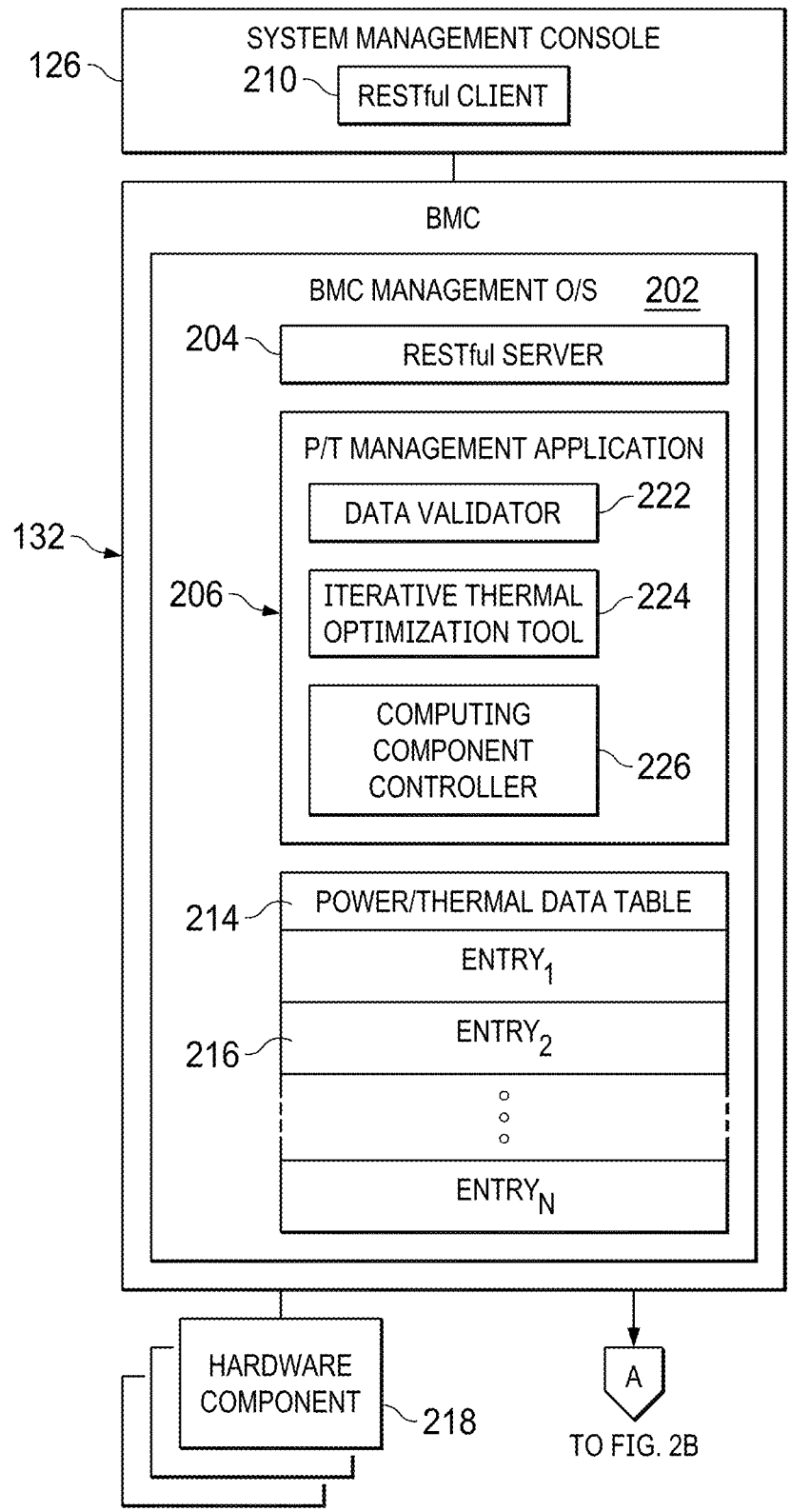
FIGS. 2A, 2B, and 2C illustrate several components of an example BMC that may be used to implement the system and method for highly granular power/thermal control according to one embodiment of the present disclosure.
Figure 2B:
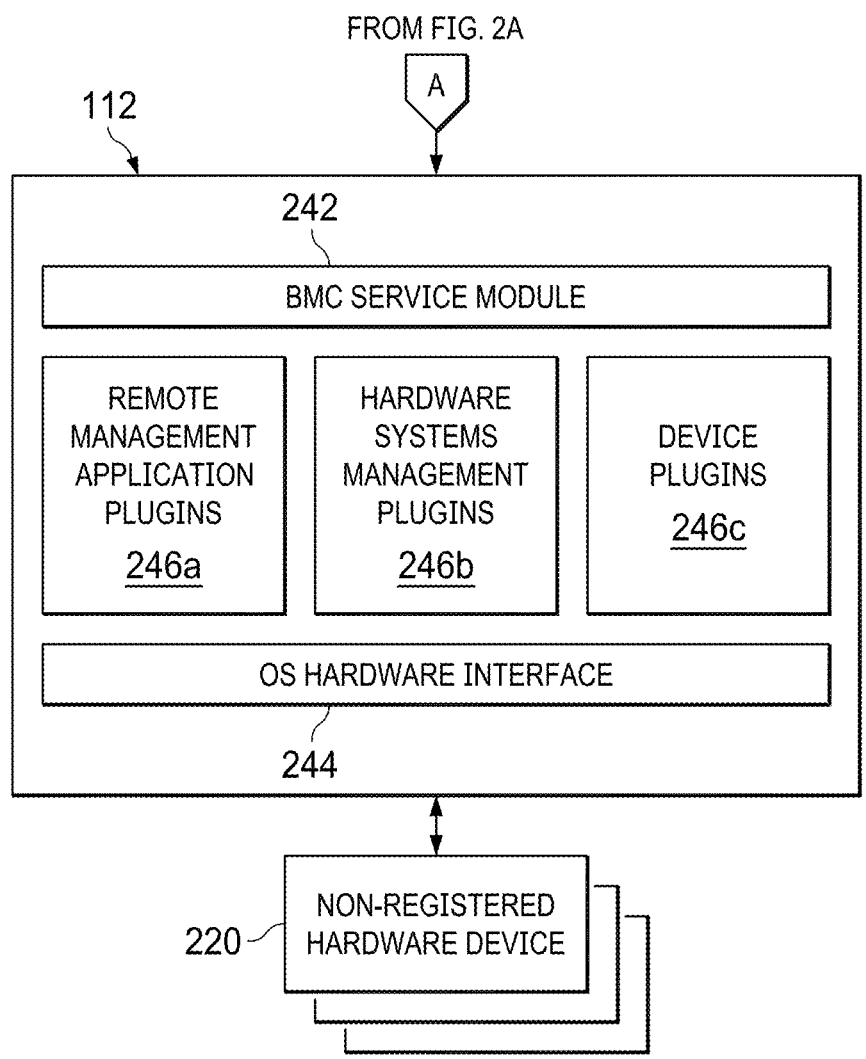

FIGS. 2A and 2B illustrate several components of an example BMC 132 that may be used to implement the system and method for highly granular power/thermal control according to one embodiment of the present disclosure. The BMC 132 includes a BMC management operating system (O/S) 202 that stores and executes a RESTful server 204 and a power/thermal management application 206. The BMC management O/S may be stored on a memory of BMC 132, which is separate and distinct from system memory 104 of IHS 100. Additionally, BMC 132 may include one or more processors (not shown), which is separate and distinct from system memory 104 of IHS 100, to execute the instructions of the BMC management O/S 200, RESTful server 204, and power/thermal management application 206. Nevertheless it should be appreciated that in other embodiments, the BMC management O/S 200, RESTful server 204, and power/thermal management application 206 may be stored in the system memory 104 of IHS 100 and executed on the one or more processors 102 of the IHS 100 without departing from the spirit and scope of the present disclosure. According to one embodiment, BMC 132 monitors and manages the physical state of IHS 100. BMC 132 includes a specialized service processor (not shown) and firmware (not shown) to provide management and monitoring capabilities independently from IHS 100. As such, BMC 132 is reachable even when IHS 100 is powered off or non-operational. In some embodiments, BMC 132 supports the standards defined in the Intelligent Platform Management Interface (IPMI) specification.

RESTful server 204 communicates with a RESTful client 210 configured in the system management console 100 to administer the operation of BMC 132. For example, RESTful server 204 may receive user input generated by RESTful client 210 at the system management console 126. The user input may include messages such as those that initiate and/or perform process 300 and process 400 described in detail below. Additionally, RESTful server 204 may receive user input for requesting and obtaining information about hardware devices (e.g., processor(s) 102, system memory 104, non-volatile storage 134, NID 122, I/O controllers 118, PSUs 130, etc.) configured in IHS 100. In one embodiment, RESTful server 204 conforms to a Redfish specification. Redfish is an open industry standard specification and schema that specifies a Representational state transfer (RESTful) interface and uses Javascript Object Notation (JSON) and Open Data Protocol (OData) to help customers integrate solutions within their existing tool chains. XML API transactional support enables configuration of multiple managed objects in a single transaction, allowing for quicker, simpler deployments.

Power/thermal management application 206 stores a power/thermal data table 214 including entries 216 for storing power profile data and thermal profile data for each hardware device in IHS 100. In particular, a power/thermal data table entry 216 may be generated for each hardware device including registered hardware devices 218, and non-registered hardware devices 220. As described previously, power profile data and thermal profile data stored in power/thermal data table entries associated with registered hardware devices 218 may be obtained from system BIOS 110 configured in IHS 100, while power profile data and thermal profile data stored in power/thermal data table entries 216 associated with non-registered hardware devices 220 may be obtained via user input through the system management console 126, or obtained via plugins 246*c* executed in O/S 112, which manage the operation of non-registered hardware devices 220. Nevertheless, it should be appreciated that the power profile data and/or thermal profile data may be obtained from other sources without departing from the spirit and scope of the present disclosure. For example, a power/thermal data table entry may be generated from a computer-readable file or other similar medium that includes power profile information and/or thermal profile information about a particular hardware device.

In some embodiments, IPMI commands, which are not usually exposed to customers for registered devices, would be exposed to OEM for non-registered devices. An ID Module (IDM) that functions somewhat like firmware that may be used for rebranding of IHS 100 (e.g., PowerEdge servers), which may also include parameters to define power/thermal data table 216 (power budget table (PBT)) for non-registered devices 220.

The power/thermal management application 206 includes a data validator 222, an iterative thermal optimization tool 224, and a hardware device controller 226. Data validator 222 validates power profile data and thermal profile data associated with a particular hardware device to ensure that the data remains within reasonable bounds. This feature may be important due to the fact that the use of improper power consumption (out of reasonable bounds data) could potentially result in damage to IHS 100, such as by overheating, electrical fire, burnt hardware devices, and the like. Examples of validation actions that may be taken by data validator 222 include verification of proper data values, comparison against other data available from a SMBIOS interface 142 or a UEFI interface 140, a class of the device, a power threshold derived from other similar devices, a proportion of the power profile data relative to the thermal profile data, a minimum and maximum range of power usage specified for the non-registered hardware device, a power budget of IHS 100 is within a limit of the capacity of the one or more power supply units, a validation against a whitelist of hardware devices, and a comparison against an allowable thermal tier range.

Iterative thermal optimization tool 224 performs a trial and error technique for determining a thermal profile of a particular hardware device 218, 220, when thermal profile data for that hardware device may be unknown. For example, a hardware device 218, 220 that has been newly introduced (recently made available through retail outlets) and configured in IHS 100 may not be registered in the system BIOS 110 of the IHS 100. As another example, a non-registered hardware device 220 may have been added to IHS 100 for a purpose built appliance to take advantage of specific features of the device that may not be relevant to a general IHS 100, yet is important for the purpose built appliance to compete in the market. It is known that any hardware device's thermal profile data may not necessarily be registered in the system BIOS 110 for any of several reasons. Iterative thermal optimization tool 224 provides a solution to this problem by iteratively testing a non-registered hardware device 220 at various cooling levels to determine an optimum cooling level for that non-registered hardware device 220. Additional details regarding the operation of iterative thermal optimization tool 224 will be described in detail herein below.

Hardware device controller 226 uses the power/thermal data table entries 216 to derive an overall power profile and/or thermal profile for IHS 100, and controls the operation of certain hardware devices of IHS 100 according to the derived overall power profile and/or thermal profile. For example, hardware device controller 226, upon determining that the overall power profile of IHS 100 is at a specified amount (e.g., 175.0 Watts), controls PSUs 130 to generate that specified amount of electrical power. Additionally, upon determining that the overall thermal profile of IHS 100 is at a specified amount (e.g., 35 British Thermal Units (BTUs)), hardware device controller 226 may control fans 136 to generate that specified amount of cooling optimal for IHS 100. In one embodiment, hardware device controller 226 may be coupled to and receive thermal data from one or more temperature sensors 146 configured in IHS 100, and adjust a level of cooling provided to IHS 100 according to the received thermal data. For example, if a particular thermal sensor 146 configured on a heat generating device, such as a central processing unit indicates that it is operating at a relatively hot temperature, hardware device controller 226 may adjust the cooling system (e.g., fans 136) so that additional cooling may be applied to the central processing unit.

As best shown in FIG. 2B, BMC 132 communicates with non-registered hardware devices 220 through server O/S 112 of IHS 100 over an in-band management interface 208, such as via an Ethernet connection. On the other hand, BMC 132 interfaces with the registered hardware devices 218 over a sideband management interface, such as an I2C sideband bus that communicates with individual registered hardware devices 218 using endpoint modules referred to as modular field replaceable units (FRUs).

As illustrated, O/S 112 may include a BMC service module 242 that interfaces with BMC 132. In various embodiments, BMC service module 242 may rely on various modules that operate within O/S 112 in order to interface with non-registered hardware devices 220 via hardware interfaces 244 that are supported by the O/S 112. Such modules may include remote management application plug-ins 246a that implement specific remote management capabilities, such as data collection in support of specific remote management tools. These modules may also include hardware systems management plugins 246b that collect system-level hardware information, such as environmental and physical security sensor data. The modules may also include device plugins 246c that specialize in collecting telemetry data from specific hardware devices and/or specific types of hardware devices. Device plugins 246c may be provided as a means for management of non-registered hardware devices 220 in which each device plugin 246c may be developed with customized logic and hardware device data that is specific to each non-registered hardware device 220. In one embodiment, each device plugin 246c may expose a common or otherwise standardized interface (e.g., software development kit (SDK)) to device plugin 246c so that new device plugins 246c can be easily added, deleted, and/or modified by a user.

Figure 2C:
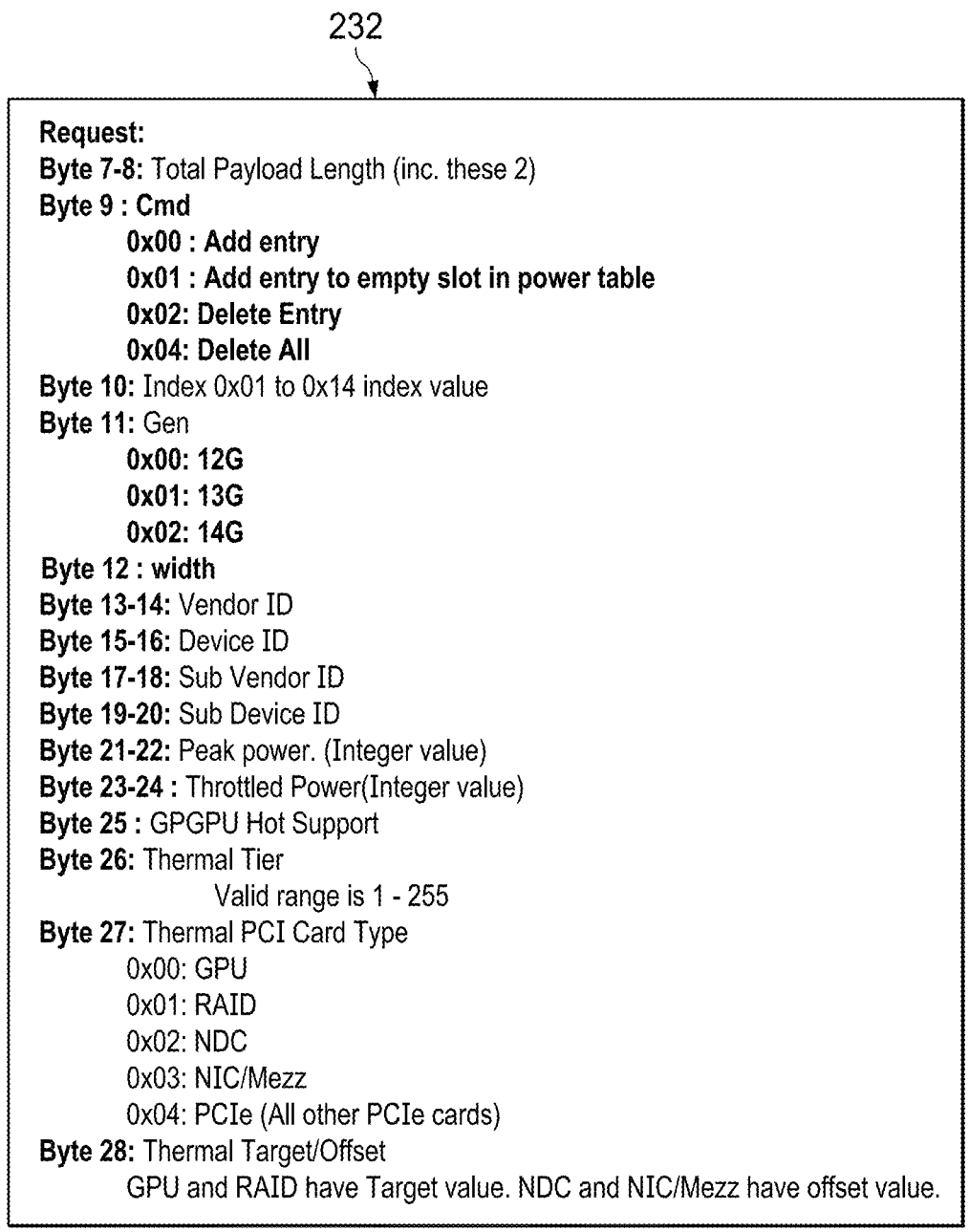

FIG. 2C illustrates an example IPMI update request message 232 that may be used to generate a power/thermal data table entry 216 according to one embodiment of the present disclosure. The particular power/thermal data table entry 216 shown includes one that conforms to the IPMI specification. It should be understood, however, that power/thermal data table entry 216 may be adapted to conform to any specification that allows power profile data and thermal profile data for hardware devices of an IHS to be stored and accessed.

Conventionally, IPMI update request messages, such as message 300, are used to update a power/thermal profile data table stored in BIOS. But due to the inherent dangers associated with unrestricted access, updating of the table is not allowed in many cases. The power/thermal management application 206 provides a solution to this problem by providing a data validator 222 that disallows or otherwise restricts entries that could potentially damage IHS 100 by ensuring the validity of values obtained via user entry.

In one embodiment, entries associated with registered components stored in the table of BIOS is accessed and replicated in power/thermal data table 214 on BMC 132. The table 214 is then augmented with entries associated with non-registered components and stored in power/thermal data table 214 on BMC 132. This resulting augmented table is then emulated to BMC 132 for enhanced granular control over the power profile and/or thermal profile of IHS 100.

Figure 3:
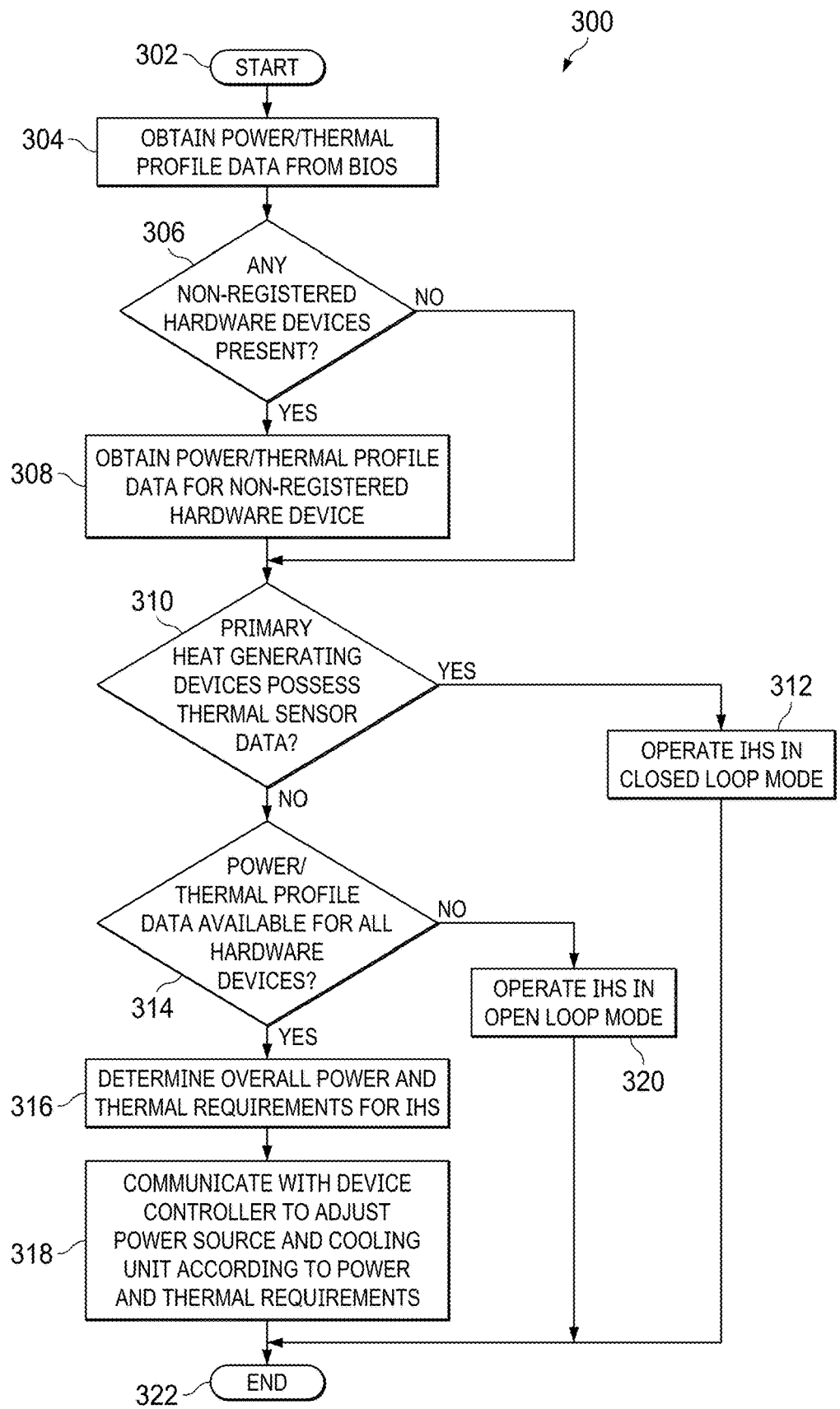
FIG. 3 illustrates an example power/thermal profile data acquisition process that may be performed by the BMC to optimize power supplied to the IHS and/or thermal cooling provided for the IHS according to one embodiment of the present disclosure.

FIG. 3 illustrates an example power/thermal profile data acquisition process 300 that may be performed by the BMC 132 to optimize power supplied to IHS 100 and/or thermal cooling provided for IHS 100 according to one embodiment of the present disclosure. The power/thermal profile data acquisition process 300 may be performed at any suitable time. For example, power/thermal profile data acquisition process 300 may be performed when IHS 100 is initially started (e.g., turned up) for the first time. As another example, whenever a hardware device is added, modified, or removed from the IHS 100, or whenever firmware of an existing hardware device is updated, or even when IHS 100 itself is updated, the process 300 may be performed again. At step 302, the process starts.

At step 304, power/thermal management application 206 obtains power/thermal profile data from registered devices. In one embodiment, power/thermal management application 206 obtains the power/thermal profile data from BIOS 110 via a UEFI interface 140. In another embodiment, power/thermal management application 206 obtains the power/thermal profile data from BIOS 110 via a SMBIOS interface 142. Once obtained, the power/thermal management application 206 stores the power/thermal profile data as power/thermal data table entries 216 in the memory of BMC 132.

At step 306, the power/thermal management application 206 determines whether any non-registered hardware devices 220 are present. For example, power/thermal management application 206 may attempt to obtain the power/thermal profile data from BIOS 110 via UEFI interface 140 and SMBIOS interface 142, and if successful, deem the hardware device to be registered. On the other hand, is no power/thermal profile data is available from BIOS 110 via UEFI interface 140 or SMBIOS interface 142, deem the hardware device to be non-registered. If the hardware device is deemed to be non-registered, processing continues at step 310; otherwise, processing continues at step 308. At step 308 power/thermal management application 206 obtains power profile data and thermal profile data for non-registered hardware devices 220 in the IHS 100. In one embodiment, the power/thermal management application 206 obtains the power profile data and thermal profile data according to user entry, such as from the user at system management console 100 through RESTful server 204.

In one embodiment, RESTful server 204 comprises a Redfish interface. A Redfish interface may be beneficial because it provides session management for secure communication between the system management console 100 and power/thermal management application 206. The Redfish interface may also be beneficial because it provides transaction control; that is, it possesses the ability to independently address multiple BMCs 132 simultaneously. In other embodiments, the power/thermal management application 206 may obtain power/thermal profile data by any suitable means such as via a computer generated file in which the power/thermal profile data is stored. In one embodiment, the power/thermal management application 206 may obtain thermal profile data for a particular hardware device according to an iterative thermal optimization process. The iterative thermal optimization process will be described in detail herein below.

At step 310, power/thermal management application 206 determines whether any hardware devices, which are the primary heat generating devices in IHS 100, possess thermal sensor data. In many cases, only one or a few hardware devices configured in IHS 100 are primarily responsible for the heat generated in IHS 100. Examples of such components may include the processing units of the IHS 100, one or more graphics processing units (GPUs) of the IHS 100, general purpose computing on graphics processing units (GPGPUs), and/or RAID controllers. Because of this characteristic, power/thermal management application 206 determines whether thermal sensor data exists for these components. If so, power/thermal management application 206 configures IHS 100 to operate in a closed loop mode at step 312. As described herein, the closed loop mode refers to a process whereby the electrical power provided to IHS 100, and/or thermal cooling provided for IHS 100 is regulated at a relatively constant level using negative feedback based upon ongoing measurements obtained from the thermal sensor data. When power/thermal management application 206 completes step 312, processing continues at step 322 in which the process ends.

At step 314, power/thermal management application 206 determines whether power/thermal profile data is available for all hardware devices. For example, power/thermal management application 206 may recognize that one or more hardware devices are present in IHS 100 via information obtained from system BIOS 110, yet no power/thermal profile data is available for those devices. In such a case, power/thermal management application 206 may control IHS 100 to operate in an open loop mode at step 320. As described herein, open loop mode refers to a process whereby electrical power and/or cooling for IHS 100 is provided without any feedback control (e.g., regulation). As such, power/thermal management application 206 configures IHS 100 for maximum electrical power provided by PSUs 130 and/or maximum cooling provided by fans 136. Nevertheless, if power/thermal profile data is available for all hardware devices, power/thermal management application 206 continues processing at step 316.

At step 316, power/thermal management application 206 determines overall power and thermal requirements for IHS 100. For example, power/thermal management application 206 may calculate a cumulative value of all of the individual electrical power requirements of each individual hardware device to determine an overall power requirement, and calculate a cumulative value of all of the individual cooling requirements of each individual hardware device to determine an overall cooling profile. Thereafter at step 318, hardware device controller 226 communicates with PSUs 130 to adjust to electrical power level that is provided to the hardware devices of the IHS 100, and communicate with fans 136 to adjust level of cooling provided to the hardware devices of IHS 100.

The process described above may be repeatedly performed each time the electrical power provided by power supply units 130 to IHS 100, or cooling provided by fans 136 to IHS 100 is to be optimized. Nevertheless at step 322, the process ends.

Although FIG. 3 describes one example of a process that may be performed by BMC 132 for managing a power profile and a thermal profile for an IHS 100, the features of the disclosed process may be embodied in other specific forms without deviating from the spirit and scope of the present disclosure. For example, power/thermal management application 206 may perform additional, fewer, or different operations than those operations as described in the present example. As another example, the steps of the process described herein may be performed by a computing system other than BMC 132, such as by processor(s) 102 configured on IHS 100.

Figure 4:
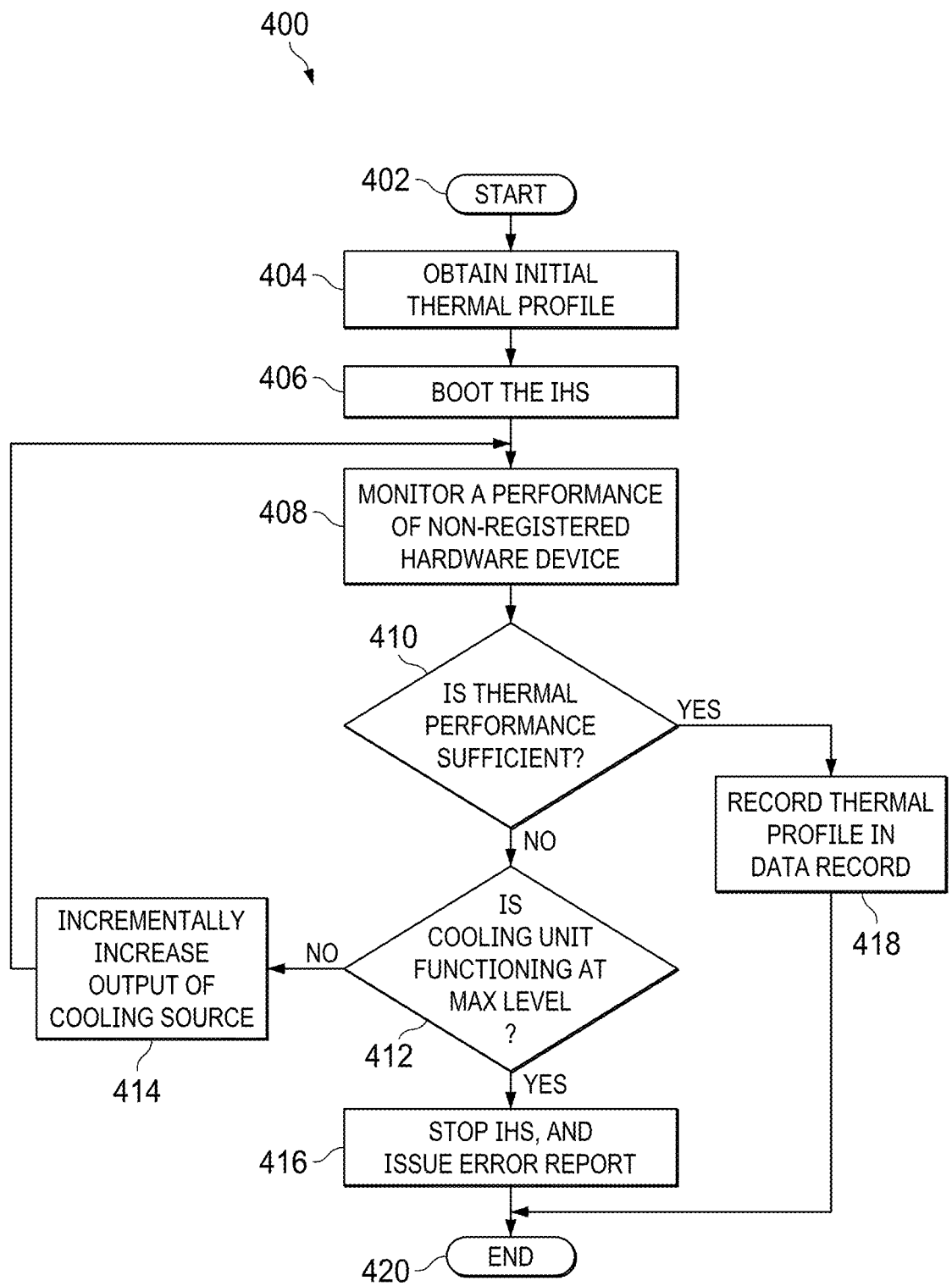
FIG. 4 illustrates an example process that may be performed by an iterative thermal optimization tool according to one embodiment of the present disclosure.

FIG. 4 illustrates an example process 400 that may be performed by iterative thermal optimization tool 224 according to one embodiment of the present disclosure. Process 400 may be performed at any suitable time, such as when thermal profile data is not available for a particular hardware device, or when a thermal profile for a hardware device has changed, such as following a firmware update in which the hardware device begins to run abnormally hot. At step 402, the process begins.

At step 404, iterative thermal optimization tool 224 obtains an initial thermal profile for a particular hardware device. In one embodiment, the initial thermal profile may be obtained according to the type (e.g. network interface card type, storage device type, processing device type, graphics rendering card type, etc.) of hardware device. For example, iterative thermal optimization tool 224 may include business logic for determining that a hardware device is a graphics processing card type for which no thermal profile data is available, and based upon that type of hardware device, determines an initial thermal profile for the graphics processing card to be 35.0 (BTUs). Nevertheless, it should be understood that iterative thermal optimization tool 224 may initially determine any desired initial thermal profile for any type of hardware device configured in IHS 100. For example, iterative thermal optimization tool 224 may estimate an initial thermal profile according to an electrical power profile associated with that hardware device. In such a case, the initial thermal profile determined for that hardware device may be a function of, or proportional to, it's electrical power consumption rating.

At step 406, iterative thermal optimization tool 224 boots or reboots the O/S of IHS 100. Thereafter at step 408, iterative thermal optimization tool 224 monitors a performance of the non-registered hardware device. After a warm-up period, iterative thermal optimization tool 224 determines whether a thermal performance of the hardware device is sufficient at 410. The thermal performance of the hardware device may include, for example, whether or not the power usage (e.g., power budget) of the non-registered hardware device is higher than existing power capacity of the system such that it halts the IHS 100 during BIOS Power On Self Test (POST) with an F1 or F2 error. Another example of monitoring the thermal performance of the non-registered computing device may include detecting whether or not the computing device ceases functioning due to under cooling, or even if the entire system goes into a throttled or an over-temperature trip state due to insufficient cooling. Other means of monitoring the thermal performance of the non-registered hardware device exist.

If the thermal performance of hardware devices is sufficient, processing continues at step 418; otherwise, processing continues at step 412. At step 418, application 206 records the empirically derived thermal profile in power/thermal profile data table entry 216, and then proceeds on to step 420 in which the application 206 ends. Nevertheless, if the thermal performance is not sufficient, processing continues at step 412.

At step 412, iterative thermal optimization tool 224 determines whether cooling unit (e.g., fans 136) are functioning at a maximum level (e.g., 100%). If so, processing continues at step 414 in which application 206 incrementally increases output of cooling unit. For example, application 206 may incrementally increase output of a cooling unit, such as one or more fans 136, by increasing a power level applied to those fans (e.g., from 40% to 50%). Nevertheless, if the cooling unit is already operating at its maximum level (e.g., 100%), iterative thermal optimization tool 224 continues operation at step 416 in which the IHS is halted, and an error report is issued. For example, the application 206 may generate a pop-up window on a display of system management console 126 indicating to the user that IHS 100 has been halted due to an overheating problem associated with one of its hardware devices. As another example, IHS 100 may generate a system event log (SEL) in such cases that can drive the server LED behavior, the error reported in the server front panel LCD, and/or the error communicated to management console via SNMP or Redfish interfaces. Embodiments of the present disclosure may provide an advantage in that plugins 246c helps helps BMC 132 to provide a unified status (combination of registered and non-registered devices status) to SEL, front panel LCD, SNMP, and/or Redfish interfaces. If, however, the cooling unit has not reached its maximum level, processing continues at step 408.

The process described above may be repeatedly performed each time a thermal profile of a hardware device is to be empirically derived. Nevertheless, when use of the process 400 is no longer needed or desired, the process 400 ends at step 420.

Although FIG. 4 describes one example of a process that may be performed by BMC 132 for empirically deriving a thermal profile for a hardware device, the features of the disclosed process may be embodied in other specific forms without deviating from the spirit and scope of the present disclosure. For example, iterative thermal optimization process 400 may perform additional, fewer, or different operations than those operations as described in the present example. As another example, the steps of the process described herein may be performed by a computing system other than BMC 132, such as by processor(s) 102 configured on IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices; and
a Baseboard Management Controller (BMC) in communication with the plurality of hardware devices, the BMC including:
a baseboard processor; and
baseboard memory including instructions that, upon execution by the baseboard processor, cause the BMC to:
identify at least one non-registered hardware device from among the plurality of hardware devices by determining that power profile data for the at least one non-registered hardware device does not exist in a Basic Input/Output System (BIOS) of the IHS;
obtain, using a plugin associated with the non-registered hardware device, power profile data for the at least one non-registered hardware device;
monitor a functionality of the non-registered hardware device; and
for each instance that the non-registered hardware device ceases to function properly due to under cooling:
perform a system reboot of the IHS;
incrementally increase a specified amount of cooling provided by one or more cooling units to the non-registered hardware device, the specified amount being less than a maximum cooling level; and
continue to monitor the functionality of the non-registered hardware device.

2. The IHS of claim 1, wherein the instructions further cause the BMC to:
obtain, using the plugin associated with the non-registered hardware device, thermal profile data for the non-registered hardware device;
using the thermal profile data of the non-registered hardware device, determine a level of thermal cooling for the non-registered hardware device; and
control the one or more cooling units to cool the non-registered hardware device.

3. The IHS of claim 1, wherein the instructions further cause the BMC to identify one or more registered hardware devices from among the plurality of hardware devices by accessing the BIOS of the IHS.

4. The IHS of claim 3, wherein the instructions further cause the BMC to access the BIOS using a System Management BIOS (SMBIOS) interface.

5. The IHS of claim 3, wherein the instructions further cause the BMC to access the BIOS using a Unified Extensible Firmware Interface (UEFI) interface.

6. The IHS of claim 1, wherein the instructions further cause the BMC to identify the non-registered hardware device according to user input.

7. The IHS of claim 2, wherein the instructions further cause the BMC to validate the power profile data and the thermal profile data according to at least one of a proper data value, comparison against other data available from a SMBIOS interface or a UEFI interface, a class of the device, a power threshold derived from other similar devices, a proportion of the power profile data relative to the thermal profile data, a minimum and maximum range of power usage specified for the non-registered hardware device, a power budget of the IHS is within a limit of the capacity of the one or more power supply units, a validation against a whitelist of hardware devices, and a comparison against an allowable thermal tier range.

8. The IHS of claim 1, wherein the instructions further cause the BMC to, when the amount of cooling has been incrementally increased to the maximum level, shut down the IHS and generate an error report.

9. A method comprising:
identifying, using at least one memory coupled to at least one processor, at least one non-registered hardware device from among the plurality of hardware devices by determining that power profile data for the at least one non-registered hardware device does not exist in a Basic Input/Output System (BIOS) of the IHS;
obtaining, using the at least one memory, power profile data for the at least one non-registered hardware device using a plugin associated with the non-registered hardware device;
monitoring a functionality of the non-registered hardware device; and
for each instance that the non-registered hardware device ceases to function properly due to under cooling:
performing a system reboot of the IHS;
incrementally increasing a specified amount of cooling provided by one or more cooling units to the non-registered hardware device, the specified amount being less than a maximum cooling level; and
continuing to monitor the functionality of the non-registered hardware device.

10. The method of claim 9, further comprising:
obtaining, using the plugin associated with the non-registered hardware device, thermal profile data for the non-registered hardware device;
using the thermal profile data of the non-registered hardware device, determining a level of thermal cooling for the non-registered hardware device; and
controlling the one or more cooling units to cool the non-registered hardware device.

11. The method of claim 9, further comprising identifying one or more registered hardware devices from among the plurality of hardware devices by accessing the BIOS of the IHS.

12. The method of claim 11, further comprising accessing the BIOS using a System Management BIOS (SMBIOS) interface.

13. The method of claim 11, further comprising accessing the BIOS using a Unified Extensible Firmware Interface (UEFI) interface.

14. The method of claim 9, further comprising identifying the non-registered hardware device according to user input.

15. The method of claim 10, further comprising validating the power profile data and the thermal profile data according at least one of a proper data value, comparison against other data available from a SMBIOS interface or a UEFI interface, a class of the device, a power threshold derived from other similar devices, a proportion of the power profile data relative to the thermal profile data, a minimum and maximum range of power usage specified for the non-registered hardware device, a power budget of the IHS is within a limit of the capacity of the one or more power supply units, a validation against a whitelist of hardware devices, and a comparison against an allowable thermal tier range.

16. The method of claim 9, further comprising:
when the amount of cooling has been incrementally increased to the maximum level, shutting down the IHS and generating an error report.

17. A non-transitory computer readable medium having program instructions stored thereon that, upon execution by a baseboard Management Controller (BMC) of an Information Handling System (IHS), cause the BMC to:
identify at least one non-registered hardware device from among the plurality of hardware devices by determining that power profile data for the at least one non-registered hardware device does not exist in a Basic Input/Output System (BIOS) of the IHS;
obtain, using a plugin associated with the non-registered hardware device, power profile data for the at least one non-registered hardware device;
monitor a functionality of the non-registered hardware device; and
for each instance that the non-registered hardware device ceases to function properly due to under cooling:
perform a system reboot of the IHS;
incrementally increase a specified amount of cooling provided by one or more cooling units to the non-registered hardware device, the specified amount being less than a maximum cooling level; and
continue to monitor the functionality of the non-registered hardware device.

18. The non-transitory computer readable medium of claim 17, wherein the instructions further cause the BMC to:
obtain, using the plugin associated with the non-registered hardware device, thermal profile data for the non-registered hardware device;
using the thermal profile data of the non-registered hardware device, determine a level of thermal cooling for the non-registered hardware device; and
control the one or more cooling units to cool the non-registered hardware device.

* * * * *